(12) United States Patent
Hashimoto et al.

(10) Patent No.: US 9,661,177 B2
(45) Date of Patent: May 23, 2017

(54) PHOTOELECTRIC CONVERSION ELEMENT, IMAGE READING DEVICE, IMAGE FORMING APPARATUS, AND PHOTOELECTRIC CONVERSION METHOD

(71) Applicants: Hideki Hashimoto, Kanagawa (JP); Masamoto Nakazawa, Kanagawa (JP)

(72) Inventors: Hideki Hashimoto, Kanagawa (JP); Masamoto Nakazawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/955,569

(22) Filed: Dec. 1, 2015

(65) Prior Publication Data

US 2016/0173719 A1    Jun. 16, 2016

(30) Foreign Application Priority Data

Dec. 15, 2014    (JP) ................................. 2014-253474

(51) Int. Cl.
    *H04N 1/04*     (2006.01)
    *H04N 1/053*    (2006.01)
    *H04N 5/378*    (2011.01)

(52) U.S. Cl.
    CPC ............. *H04N 1/053* (2013.01); *H04N 5/378* (2013.01)

(58) Field of Classification Search
    CPC ......... H04N 2201/0081; H04N 5/3692; H04N 17/002; H04N 1/00798; H04N 1/00933;
    (Continued)

(56) References Cited

U.S. PATENT DOCUMENTS 4,661,929 A *   4/1987  Aoki ................... G11C 11/4091
                                              365/149
6,474,555 B1 *  11/2002 Tsunobuchi ....... G06K 7/10613
                                              235/462.01
(Continued)

FOREIGN PATENT DOCUMENTS

JP    2000-152082    5/2000
JP    2010-041460    2/2010
JP    2014-138406    7/2014

OTHER PUBLICATIONS

U.S. Appl. No. 14/745,967, filed Jun. 22, 2015.
(Continued)

*Primary Examiner* — Negussie Worku
(74) *Attorney, Agent, or Firm* — Oblon, McClelland, Maier & Neustadt, L.L.P.

(57) ABSTRACT

Multiple photodetectors that photoelectric convert incident light to output a pixel signal; multiple analog/digital (A/D) convertors that A/D convert a plurality of pixel signals that are output by the photodetectors in parallel in a plurality of systems; a retaining unit that retains the pixel signals A/D converted in parallel by the A/D convertors in an aligned manner in one direction, to be arranged in reading order from a first pixel signal to a final pixel signal; and multiple transfer units that transfer the pixel signals arranged and retained by the retaining unit, sequentially from the first pixel signal from a first-pixel-signal retaining position toward a final-pixel signal retaining position of the retaining unit are included.

13 Claims, 22 Drawing Sheets

(58) Field of Classification Search
CPC ........... H04N 1/32475; H04N 21/4316; H04N 21/482; H04N 5/33; H04N 5/372; H04N 5/3765; H04N 5/378; H04N 5/45; H04N 1/00257
USPC ................ 358/474, 475, 482, 443, 445, 498
See application file for complete search history.

(56) References Cited

U.S. PATENT DOCUMENTS

| | | | |
|---|---|---|---|
| 7,256,380 B2* | 8/2007 | Kamisuwa | H04N 3/1581 250/208.1 |
| 2007/0188638 A1 | 8/2007 | Nakazawa et al. | |
| 2008/0252787 A1 | 10/2008 | Nakazawa et al. | |
| 2009/0207293 A1* | 8/2009 | Ryoki | H04N 5/3575 348/308 |
| 2010/0027061 A1 | 2/2010 | Nakazawa | |
| 2010/0033609 A1 | 2/2010 | Kato et al. | |
| 2010/0171998 A1 | 7/2010 | Nakazawa | |
| 2011/0026083 A1 | 2/2011 | Nakazawa | |
| 2011/0051201 A1 | 3/2011 | Hashimoto et al. | |
| 2011/0063488 A1 | 3/2011 | Nakazawa | |
| 2012/0008173 A1 | 1/2012 | Konno et al. | |
| 2012/0092732 A1 | 4/2012 | Nakazawa | |
| 2012/0224205 A1 | 9/2012 | Nakazawa | |
| 2013/0004021 A1* | 1/2013 | Nagaoka | B60R 1/00 382/103 |
| 2013/0063792 A1 | 3/2013 | Nakazawa | |
| 2014/0029065 A1 | 1/2014 | Nakazawa | |
| 2014/0111675 A1* | 4/2014 | Tatsuzawa | H04N 5/341 348/302 |
| 2014/0204427 A1 | 7/2014 | Nakazawa | |
| 2014/0204432 A1* | 7/2014 | Hashimoto | H04N 1/00798 358/475 |
| 2014/0211273 A1 | 7/2014 | Konno et al. | |
| 2014/0368893 A1 | 12/2014 | Nakazawa et al. | |
| 2015/0098117 A1 | 4/2015 | Marumoto et al. | |
| 2015/0116794 A1 | 4/2015 | Nakazawa | |
| 2015/0144774 A1* | 5/2015 | Fritsch | G01D 5/26 250/231.1 |
| 2015/0163378 A1 | 6/2015 | Konno et al. | |
| 2015/0222790 A1 | 8/2015 | Asaba et al. | |
| 2015/0304517 A1 | 10/2015 | Nakazawa et al. | |
| 2016/0003673 A1* | 1/2016 | Hashimoto | G01J 1/46 358/475 |
| 2016/0373604 A1* | 12/2016 | Hashimoto | H04N 5/361 |

OTHER PUBLICATIONS

U.S. Appl. No. 14/750,143, filed Jun. 25, 2015.
U.S. Appl. No. 14/847,038, filed Sep. 8, 2015.
U.S. Appl. No. 14/873,628, filed Oct. 2, 2015.
U.S. Appl. No. 14/922,546, filed Oct. 26, 2015.

* cited by examiner

PHOTOELECTRIC CONVERSION ELEMENT, IMAGE READING DEVICE, IMAGE FORMING APPARATUS, AND PHOTOELECTRIC CONVERSION METHOD

CROSS-REFERENCE TO RELATED APPLICATIONS

The present application claims priority to and incorporates by reference the entire contents of Japanese Patent Application No. 2014-253474 filed in Japan on Dec. 15, 2014.

BACKGROUND OF THE INVENTION

1. Field of the Invention

The present invention relates to a photoelectric conversion element, an image reading device, an image forming apparatus, and a photoelectric conversion method.

2. Description of the Related Art

As a complementary metal oxide semiconductor (CMOS) image sensor, one of a column type has been known that has a floating diffusion (FD) amplifier per pixel, and that has an analog digital convertor (ADC) per column so that one line is selected from a pixel array to be read out at the same time in a column direction for an output thereof, and that extracts an image signal as a digital signal.

Moreover, among CMOS line sensors, there is one in which a processing circuit for one column is configured with, for example, three pixels of R/G/B for pixels that R/G/B are aligned in a main scanning direction, and in which pixel signals that have been processed in multiple columns in parallel are serialized to be read. However, because image signal lines of several thousands of columns are connected to a data bus to read image signals, the wiring capacity is to be large and the drive capacity becomes low, resulting in a limit in speedup.

Furthermore, in Japanese Laid-open Patent Publication No. 2010-41460, a solid-state imaging apparatus is disclosed in which multiple pieces of pixel data that are divided into a predetermined number of division pixel-data groups are fetched in a predetermined number of data blocks, each of the predetermined number of data blocks includes a data line for reading a corresponding division pixel-data group, and an amplifier unit that amplifies a signal of the data line to output as a block data output with predetermined timing, the predetermined number of data blocks are connected such that a block data output of a preceding stage is given to a data line at a following stage as a block data input, and a block data output of a data block at a final stage is to be a final data output.

Because a line sensor generally has a chip structure long in one direction, a logic unit for post processing to be integrated is arranged at either one of two end portions, and according to a constraint in layout when mounting in an image reading device, a transmission distance of image data to a device at a subsequent stage is long. If the transmission distance of image data to a device at a subsequent stage is long, the quality of transmission waveforms can be deteriorated or a skew margin can be small, and therefore, thereby making it difficult to achieve speedup. Moreover, because a cable is laid for a long distance to transmit a high-speed signal to a subsequent stage, there has been a problem that an adverse effect is caused on electromagnetic interference (EMI).

Therefore, it is desirable to provide a photoelectric conversion element, an image reading device, an image forming apparatus, and photoelectric conversion method that enable to shorten a transmission distance of output image data without decreasing processing efficiency of read data at a subsequent stage even when there is a constraint in layout at the time of mounting.

SUMMARY OF THE INVENTION

It is an object of the present invention to at least partially solve the problems in the conventional technology.

According to an aspect of the present invention, there is provided a photoelectric conversion element including: a plurality of photodetectors that are aligned in one direction, and that photoelectric convert incident light to output a pixel signal; a plurality of analog/digital (A/D) convertors that A/D convert a plurality of pixel signals that are output by the photodetectors in parallel in a plurality of systems; a retaining unit that retains the pixel signals A/D converted in parallel by the A/D convertors in an aligned manner in one direction, to be arranged in reading order from a first pixel signal to a final pixel signal; and a plurality of transfer units that transfer the pixel signals arranged and retained by the retaining unit, sequentially from the first pixel signal from a first-pixel-signal retaining position toward a final-pixel signal retaining position of the retaining unit.

According to another aspect of the present invention, there is provided an image reading device that enables operation from a front side, and that reads a document by performing photoelectric conversion on reflected light from the document that is placed on a top surface, the image reading device including: a photoelectric conversion element that is arranged so as to be opposed to a first reading reference in a linear form to be a reference position for reading of one side on a left side of the document that is arranged on a left side about an image forming lens, and that photoelectric converts reflected light from the document per pixel; and an image processing unit that is arranged on a rear surface side, and that accepts and processes a pixel signal that is obtained by photoelectric conversion by the photoelectric conversion element, wherein the photoelectric conversion element includes a plurality of photodetectors that receive, on a front surface side, reflected light from a document reference position side that is a position at which a second reading reference in a linear form to be a reference position for reading of one side on the rear surface side of the document that is arranged on the rear surface side and the first reading reference intersect at a right angle in left side of the rear surface side, that are arranged in one direction so as to receive, at the rear surface side, reflected light from the front surface side of the first reading reference, and that photoelectric convert the reflected light to output a pixel signal; a plurality of A/D convertors that A/D convert a plurality of pixel signals that are output by the photodetectors in parallel in a plurality of systems; a retaining unit that retains the pixel signals A/D converted in parallel by the A/D convertors in an aligned manner in one direction, to be arranged in reading order from a first pixel signal to a final pixel signal; and a plurality of transfer units that transfer the pixel signals arranged and retained by the retaining unit, sequentially from the first pixel signal from a first-pixel-signal retaining position toward a final-pixel signal retaining position of the retaining unit.

According to still another aspect of the present invention, there is provided a photoelectric conversion method performed by a photoelectric conversion element, the method including: photoelectric converting, by a plurality of photodetectors, incident light to output a pixel signal; A/D converting, by a plurality of analog/digital (A/D) convertors, a plurality of pixel signals that are output by the photodetectors in parallel in a plurality of systems; retaining, by a retaining unit, the pixel signals A/D converted in parallel by the A/D convertors in an aligned manner in one direction, to be arranged in reading order from a first pixel signal to a final pixel signal; and transferring, by a plurality of transfer units, the pixel signals arranged and retained by the retaining unit, sequentially from the first pixel signal from a first-pixel-signal retaining position toward a final-pixel signal retaining position of the retaining unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
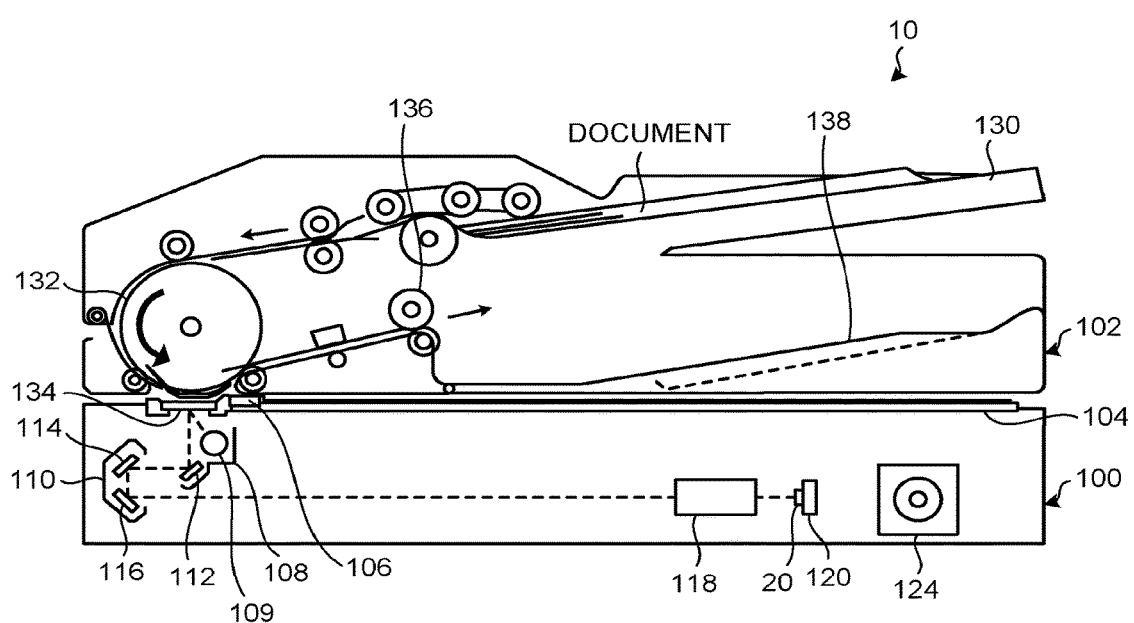
FIG. 1 is a front view depicting overview of an image reading device according to an embodiment.

An embodiment of an image reading device is explained in detail below with reference to the accompanying drawings. FIG. 1 is a front view depicting overview of an image reading device 10 according to the embodiment. The image reading device 10 is, for example, of a sheet through type, and includes a reading main unit 100 (flatbed scanner), and an automatic document feeder (ADF) 102.

The reading main unit 100 includes a contact glass 104, a reference white board 106, a first carriage 108, a second carriage 110, a lens (image forming lens) 118, a CMOS linear sensor (photoelectric conversion element) 20 that is mounted on a sensor board 120, and a scanner motor 124. The first carriage 108 includes a light source 109 and a mirror 112. The second carriage 110 includes mirrors 114 and 116. Moreover, in the reading main unit 100, a reading window 134 to read a document that is conveyed by the automatic document feeder 102 is provided.

The automatic document feeder 102 is arranged at an upper part of the reading main unit 100, and automatically feeds and conveys a document. The automatic document feeder 102 includes a document tray 130, a conveying drum 132, an ejection roller 136, an output tray 138, and the like. The automatic document feeder 102 conveys a document that is put on the document tray 130 toward the conveying drum 132, and the conveying drum 132 conveys the document toward the reading window 134. The document is exposed to light from the light source 109 when passing through the reading window 134. Reflected light from the document is returned by the mirror 112 of the first carriage 108 and the mirrors 114 and 116 of the second carriage 110, and passes through the lens 118 to be formed into a reduced image on a light reception surface of the CMOS linear sensor 20 on the sensor board 120.

Moreover, in flatbed reading in which a document is fixed on the contact glass 104, and read by scanning the first carriage 108 and the second carriage 110, the document on the contact glass 104 is exposed to light from the light source 109 from a downward direction of the contact glass 104. Reflected light from the document is returned by the mirror 112 of the first carriage 108 and the mirrors 114 and 116 of the second carriage 110, and passes through the lens 118, to be formed into a reduced image on the light reception surface of the CMOS linear sensor 20 on the sensor board 120. At this time, in the image reading device 10, the first carriage 108 moves in a sub-scanning direction of the document at a speed V, and the second carriage 110 moves at a half speed of the first carriage 108 ½V interlocked with the first carriage 108, to read an entire part of the document.

Figure 2:
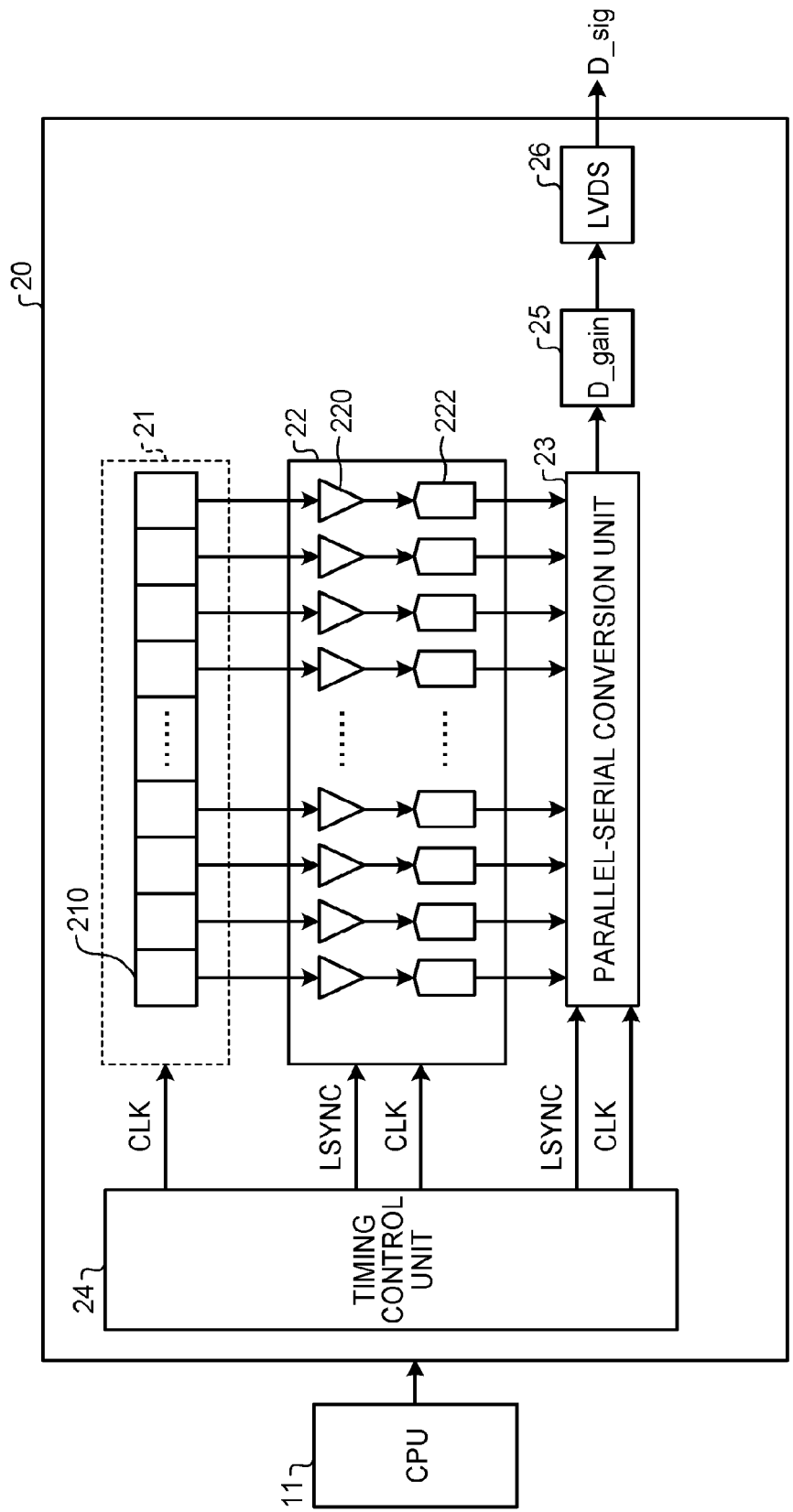
FIG. 2 depicts overview of a CMOS linear sensor that is included in the image reading device according to the embodiment, and a peripheral thereof.

FIG. 2 depicts overview of the CMOS linear sensor 20 that is included in the image reading device 10 according to the embodiment, and a peripheral thereof. The CMOS linear sensor 20 includes, for example, a photoelectric conversion unit 21, a processing unit 22, a parallel-serial conversion unit 23, a timing control unit (control unit) 24, an amplifying unit 25, and a low-voltage differential signaling (LVDS) 26, and operates according to control by the central processing unit (CPU) 11.

The photoelectric conversion unit 21 has multiple photodetectors (photodiodes) 210 that are arranged in one direction. Furthermore, the photoelectric conversion unit 21 may be configured to have multiple photodetectors (photodiodes) that are arranged in one direction for each color of R, G, B, and for example, three (may be six or more) photodetectors of R, G, B are included in one column, and a signal subjected to photoelectric conversion is output per column. Each of the photodetectors 210 photoelectric converts reflected light from a document, and outputs as an analog image signal.

The processing unit 22 has, for example, multiple programmable gain amplifiers (PGA) 220 and multiple analog/digital (A/D) convertors 222, and amplifies an analog signal that is output by the photoelectric conversion unit 21 to convert into a digital signal, and outputs in multiple systems having one processing system for each pixel, for example.

The parallel-serial conversion unit 23 serializes digital signals that have been processed in parallel output by the processing unit 22, to output to the amplifying unit 25 at a subsequent stage. Moreover, the timing control unit 24 generates a signal necessary for driving respective components constituting the CMOS linear sensor 20.

The amplifying unit 25 performs digital amplification on a serial signal that is output by the parallel-serial conversion unit 23, to output to the LVDS 26. The LVDS 26 outputs the serial signal input by the amplifying unit 25 to an external device at a subsequent stage as a low-voltage differential signal.

Figure 3:
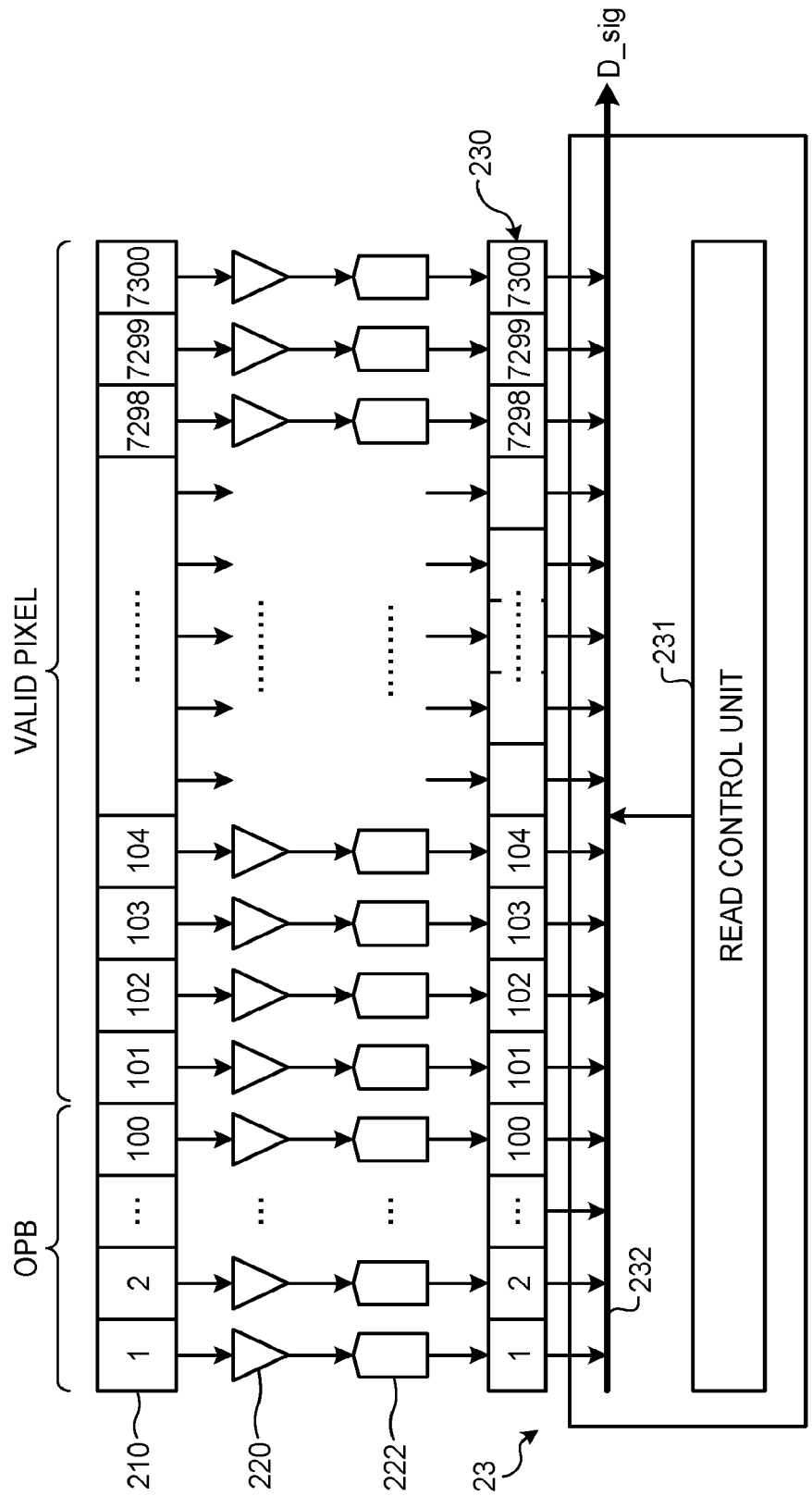
FIG. 3 depicts a first configuration example of a parallel-serial conversion unit and a peripheral thereof.

Next, specific configuration examples of the parallel-serial conversion unit 23 are described in detail. FIG. 3 depicts a first configuration example of the parallel-serial conversion unit 23 and a peripheral thereof. In the first configuration example of the parallel-serial conversion unit 23, digital signals (pixel signals) that have been A/D converted by the A/D convertors 222 are respectively retained in a line memory 230. The pixel signals that are retained by the line memory 230 are sequentially read according to control by a read control unit 231 through a common data bus 232.

Note that numbers given to the respective photodetectors 210 indicate the orders of outputting pixel data (pixel signal) by the CMOS linear sensor 20. Moreover, OPB is the light-shielded photodetector 210, and is used for black correction. A valid pixel is the photodetector 210 used in valid image data. Thus, it is assumed that for example, 7300 pieces of the photodetectors 210 are arranged in the CMOS linear sensor 20. Moreover, the line memory 230 also retains 7300 pieces of image data.

However, in the first configuration example of the parallel-serial conversion unit 23, the wiring capacity by the data bus 232 is to be large, and it sacrifices speed at the time of reading data of all pixels.

Figure 4:
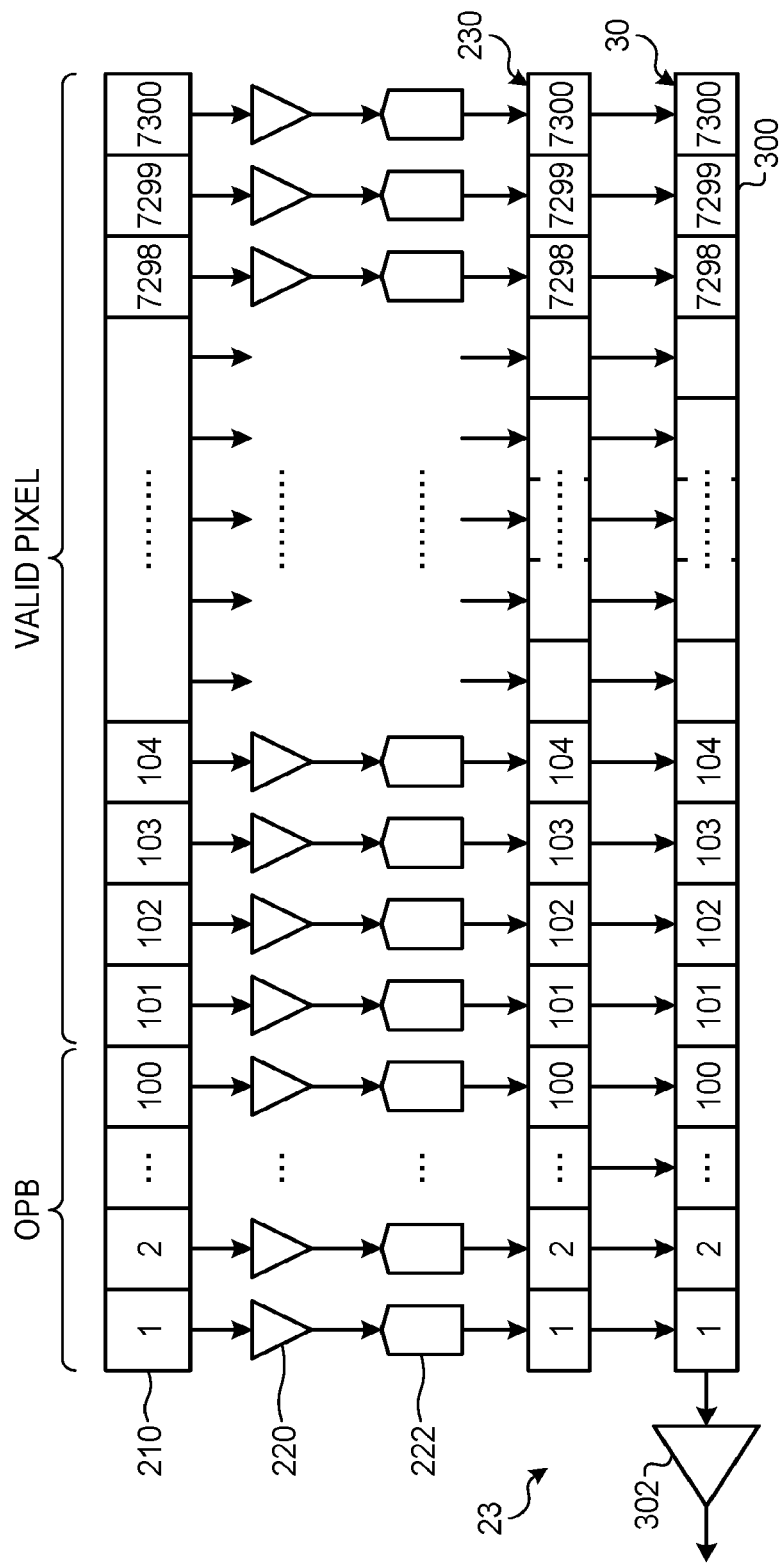
FIG. 4 depicts a second configuration example of the parallel-serial conversion unit and a peripheral thereof.

FIG. 4 depicts a second configuration example of the parallel-serial conversion unit 23 and a peripheral thereof. In the second configuration of the parallel-serial conversion unit 23, for example, a shift register 30 to which 7300 pieces of flip flops (FF) 300 are connected is arranged. The shift register 30 accepts pixel data that are retained by the line memory 230 in parallel, and outputs in serial order from pixel data that is to be output first (head pixel data having number 1) by the CMOS linear sensor 20. An output unit (output stage) 302 is arranged so that the CMOS linear sensor 20 outputs pixel data to a device at a subsequent stage, and to drive thereof.

In this example, 100 pieces of OPB pixels are arranged on a side of the head pixel. In the first configuration example of the parallel-serial conversion unit 23, to enable correction of a valid pixel using pixel data of OPB in the image processing unit at a later-stage (later-stage image processing unit 144: refer to FIG. 5), image data is output in a sequence of OPB pixels→valid pixels). In the second configuration example of the parallel-serial conversion unit 23, the output unit 302 is arranged on a side of the head pixel.

Figure 5:
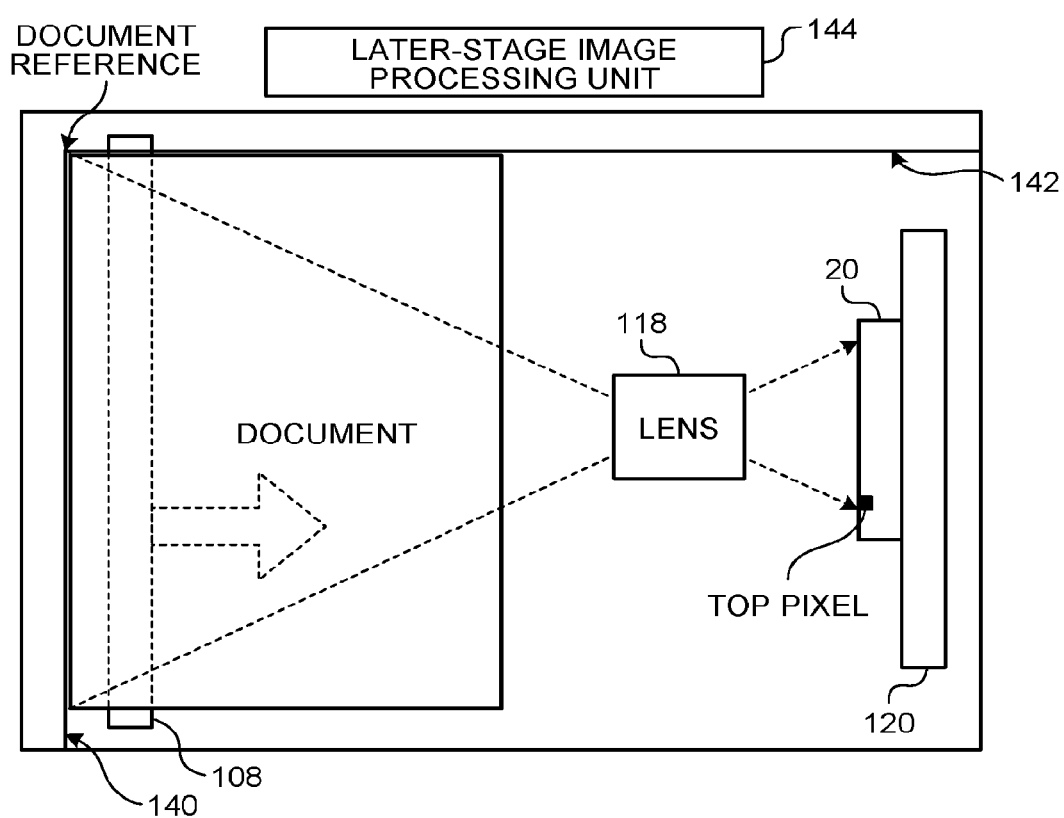
FIG. 5 depicts an essential part of a reading main unit viewed from above.

FIG. 5 depicts an essential part of the reading main unit 100 viewed from above. The reading main unit 100 that is a flatbed scanner is enabled to be operated from a front surface side (lower side in FIG. 5), and reads a document by performing photoelectric conversion on reflected light from the document that is put on an upper surface. To the reading main unit 100, a first reading reference 140 in a linear form to be a reference position for reading one line on left of the document is arranged on a left side, and a second reading reference 142 in a linear form to be a reference position for reading one line on a rear surface side of the document on a rear surface side is arranged. Moreover, a position at which the first reading reference 140 and the second reading reference 142 intersect at a right angle is a position of a document reference.

The CMOS linear sensor 20 is arranged so as to oppose to the first reading reference 140 about the lens 118, and performs photoelectric conversion on reflected light from a document per pixel. On a rear surface side of the reading main unit 100, the later-stage image processing unit (image processing unit) 144 that accepts and processes pixel data that is photoelectric converted by the CMOS linear sensor 20 is arranged.

When a document is read by a differential-mirror reduced optical system, because a document end positioned on the rear surface side of the reading main unit 100 is condensed on a pixel positioned on a user side of the CMOS linear sensor 20 through the lens 118, a top pixel is arranged on the user side of the CMOS linear sensor 20 to perform image reading as the document appears. Moreover, because an image is read by the first carriage 108 scanning from left to right (sub-scanning direction). The sensor board 120 is arranged on a right side of the reading main unit 100 when viewed from a user.

As described, the document reference is positioned on the rear surface side of the reading main unit 100 when viewed from a user, and an end of a scanning direction for a document (pixel data that is output first by the CMOS linear sensor 20) is positioned on the rear surface side of the reading main unit 100. Furthermore, the pixel that is output first by the CMOS linear sensor 20 is positioned on a side of the user.

Figure 6:
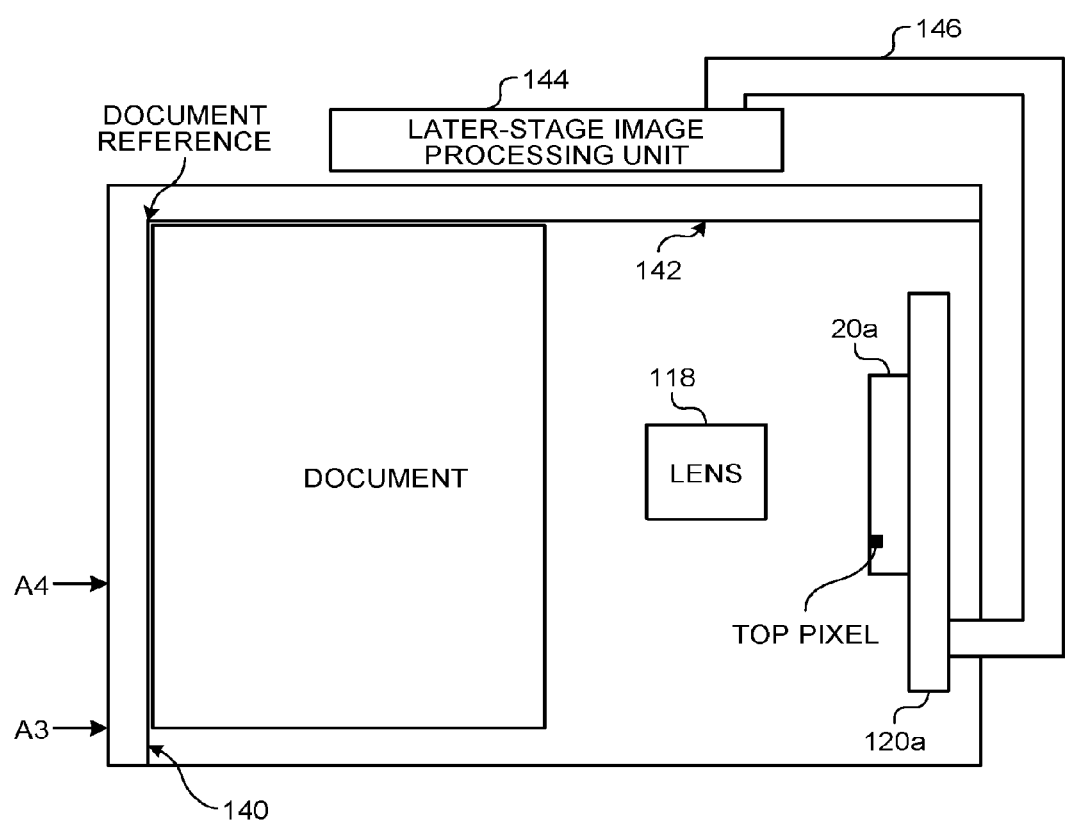
FIG. 6 depicts overview of the reading main unit when viewed from above.

Therefore, as depicted in FIG. 6, the output unit 302 of the CMOS linear sensor 20 is arranged on a user side on which a top pixel is positioned, and a harness 146 that transmits image data is laid around from the user side of the sensor board 120 to the later-stage image processing unit 144 arranged on the rear surface side of the reading main unit 100, resulting in a long transmission distance of the pixel data, thereby being disadvantageous to high speed processing and to EMI.

Figure 7:
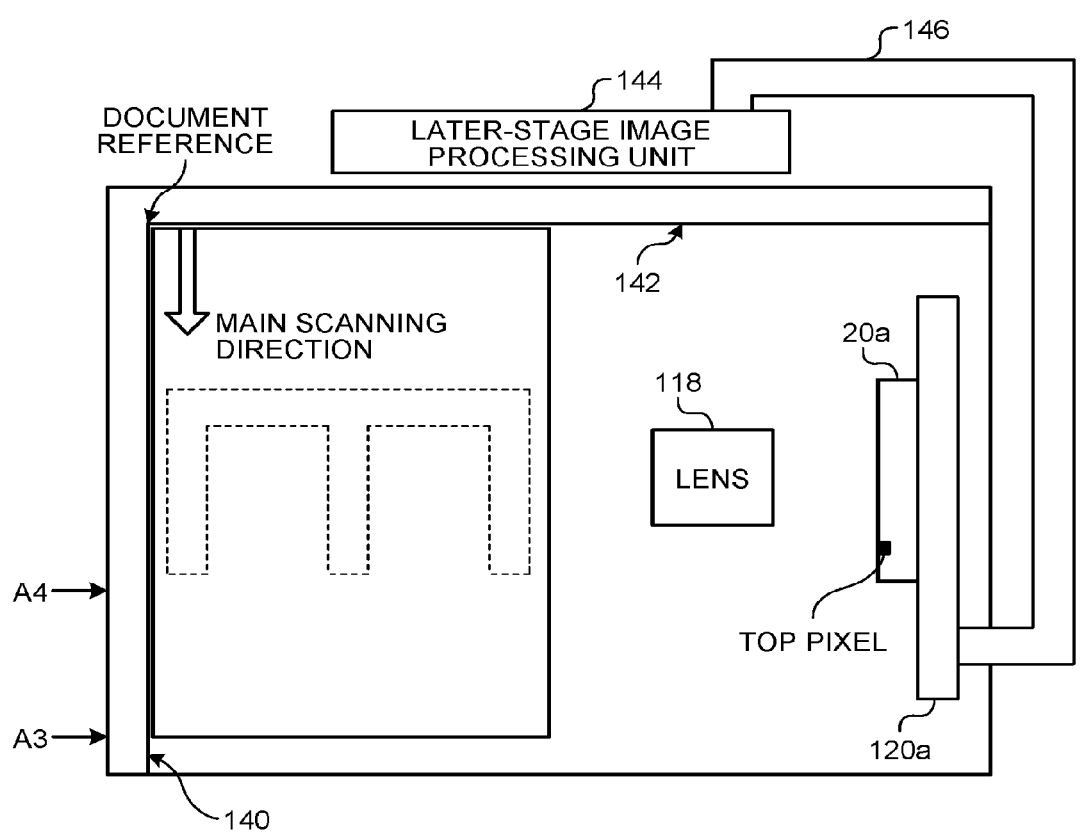
FIG. 7 depicts image reading when a document reference is arranged on a rear surface side.
Figure 8:
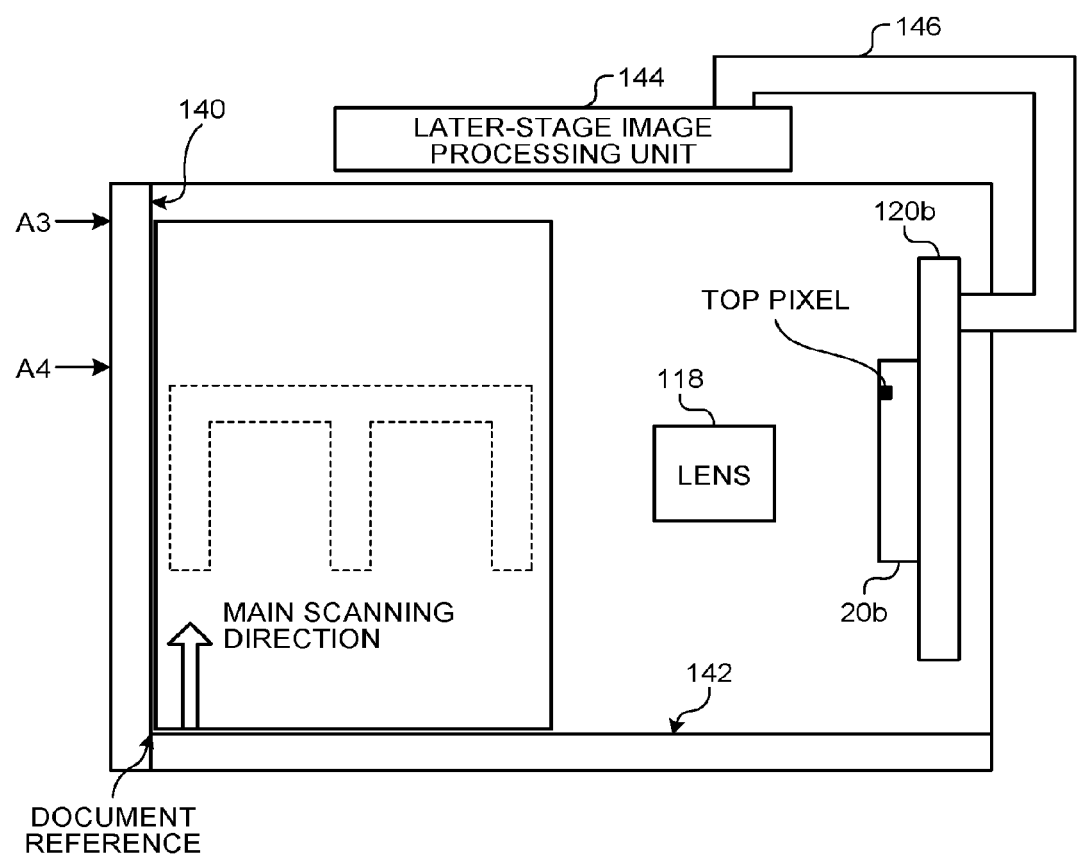
FIG. 8 depicts image reading when the document reference is arranged on a front surface side.
Figure 9:
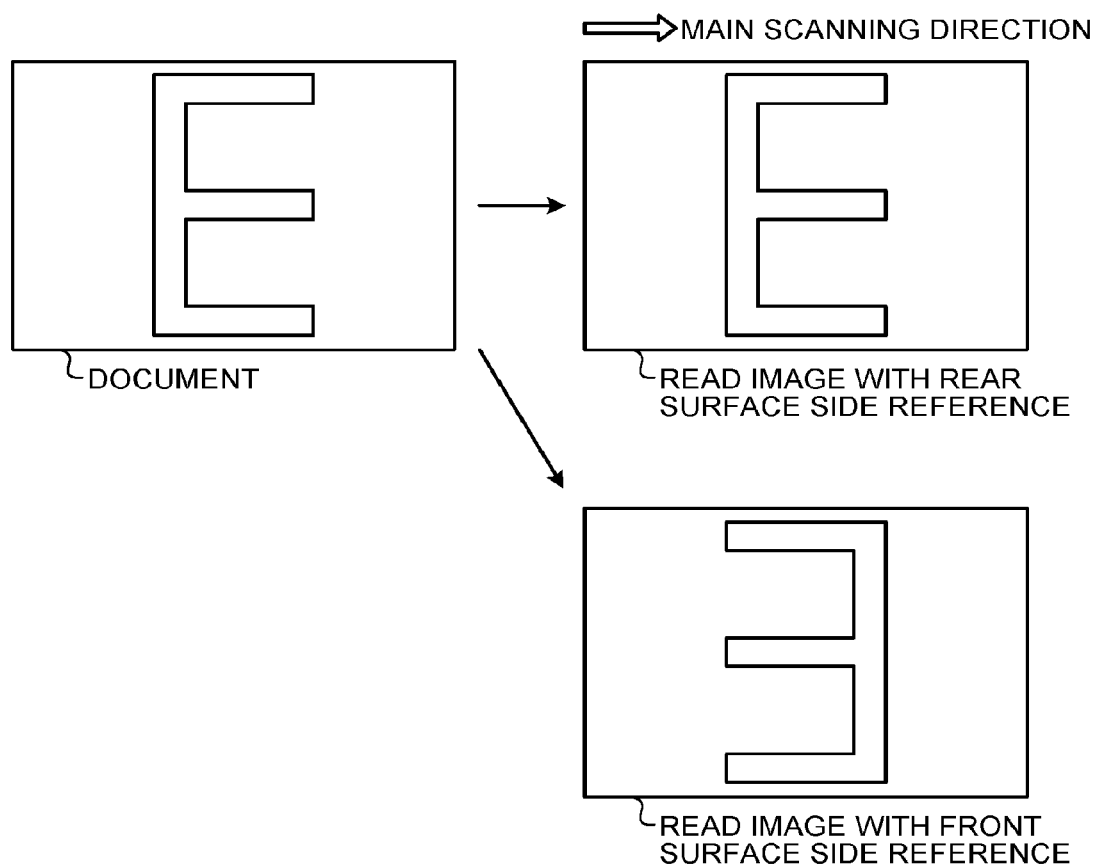
FIG. 9 depicts relation between a main scanning direction and a read image.

A reason for arranging the document reference on the rear surface side of the reading main unit 100 is explained herein. FIG. 7 depicts image reading when the document reference is arranged on the rear surface side. FIG. 8 depicts image reading when the document reference is arranged on the user side (front surface side). FIG. 9 depicts relation between a main scanning direction and a read image.

As depicted in FIG. 7, when a CMOS linear sensor 20a a top pixel of which is arranged on the front surface side is mounted on a sensor board 120a, the harness 146 is to be long. As depicted in FIG. 8, when a CMOS linear sensor 20b a top pixel of which is arranged on the rear surface side is mounted on a sensor board 120*b*, the harness 146 can be shortened.

However, as depicted in FIG. 8, if the document reference is arranged on the front surface side, the top pixel is to be positioned at a position diagonal (rear surface side) thereto about the lens 118. In this case, as depicted in FIG. 9, the main scanning direction is reversed from a case when the document reference is positioned on the rear surface side, and a read image results in an image that is horizontally reversed from the document. Accordingly, there is a necessity of mirroring (reversing) the read image in the later-stage image processing unit 144. To perform the mirroring, a memory therefor is necessary. Therefore, as depicted in FIG. 7, the document reference is arranged on the rear surface side generally.

Figure 10:
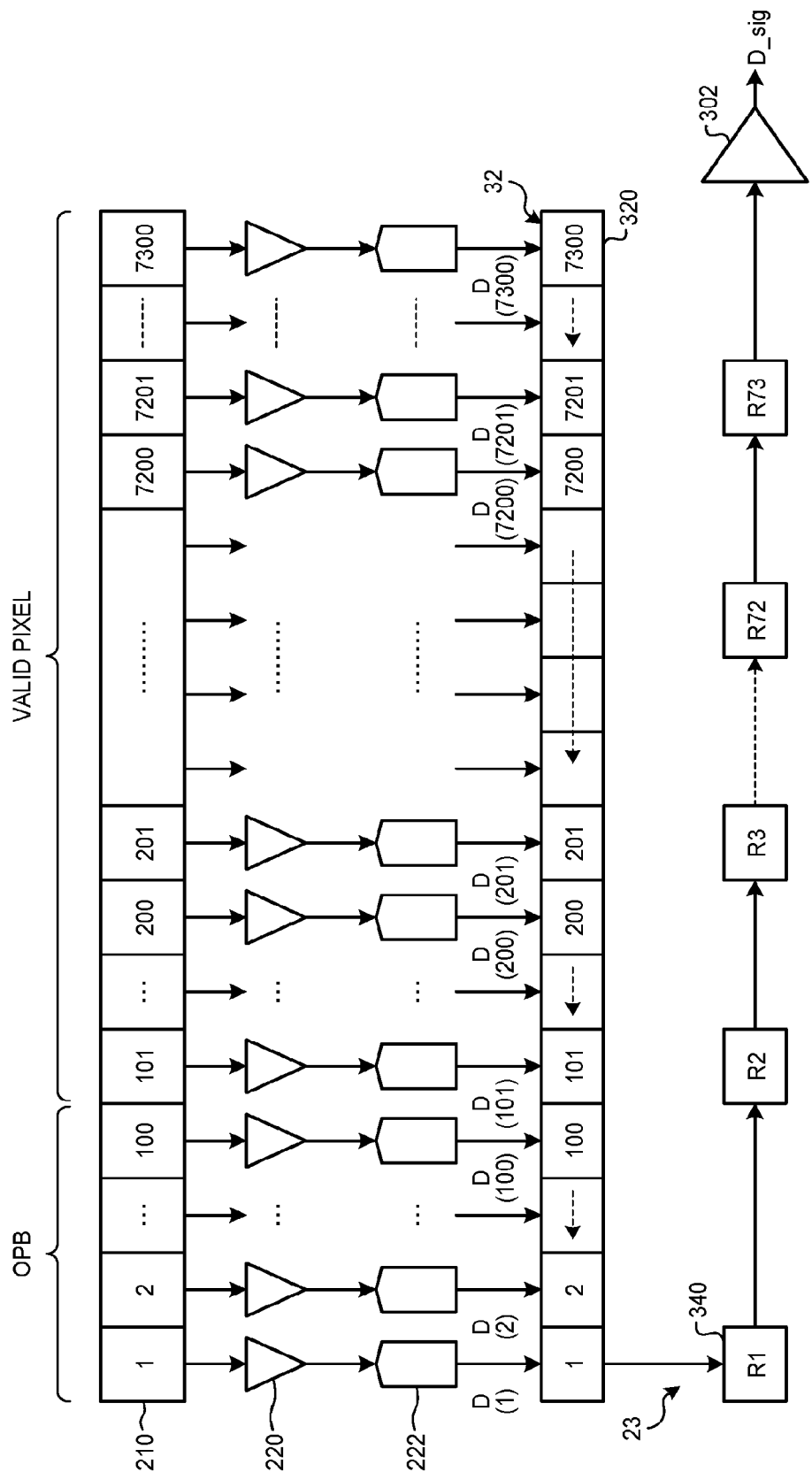
FIG. 10 depicts a third configuration example of the parallel-serial conversion unit and a peripheral thereof.

FIG. 10 depicts a third configuration example of the parallel-serial conversion unit 23 and a peripheral thereof. In the third configuration example of the parallel-serial conversion unit 23, a first shift register (retaining unit) 32 that accepts pixel data that is output by each of 7300 units of the A/D convertors 222, and sequentially outputs in serial (from top pixel data numbered 1), for example, 73 units (R1 to R73) of transfer units 340, and the output unit 302 are provided. The first shift register 32 has, for example, 7300 units of flip flops (FF) 320 connected thereto, and retains, in an aligned manner in one direction, multiple pixel signals that are A/D converted by the A/D converters 222 in parallel, arranging in one direction, and aligns from a first pixel signal to a final pixel signal.

Each of the transfer units 340 transfers the pixel data (pixel signals) that are retained by the first shift register 32 in an aligned manner, from a first-pixel-data retaining position toward a final-pixel-data retaining position of the first shift register 32, sequentially from the first pixel data. That is, 73 units of the transfer units 340 constitute a second shift register. The output unit 302 is arranged on a side of a final-pixel-data retaining position (right side in FIG. 10) of the first shift register 32. The transfer units 340 may be buffers each of which transfers a signal.

Figure 11:
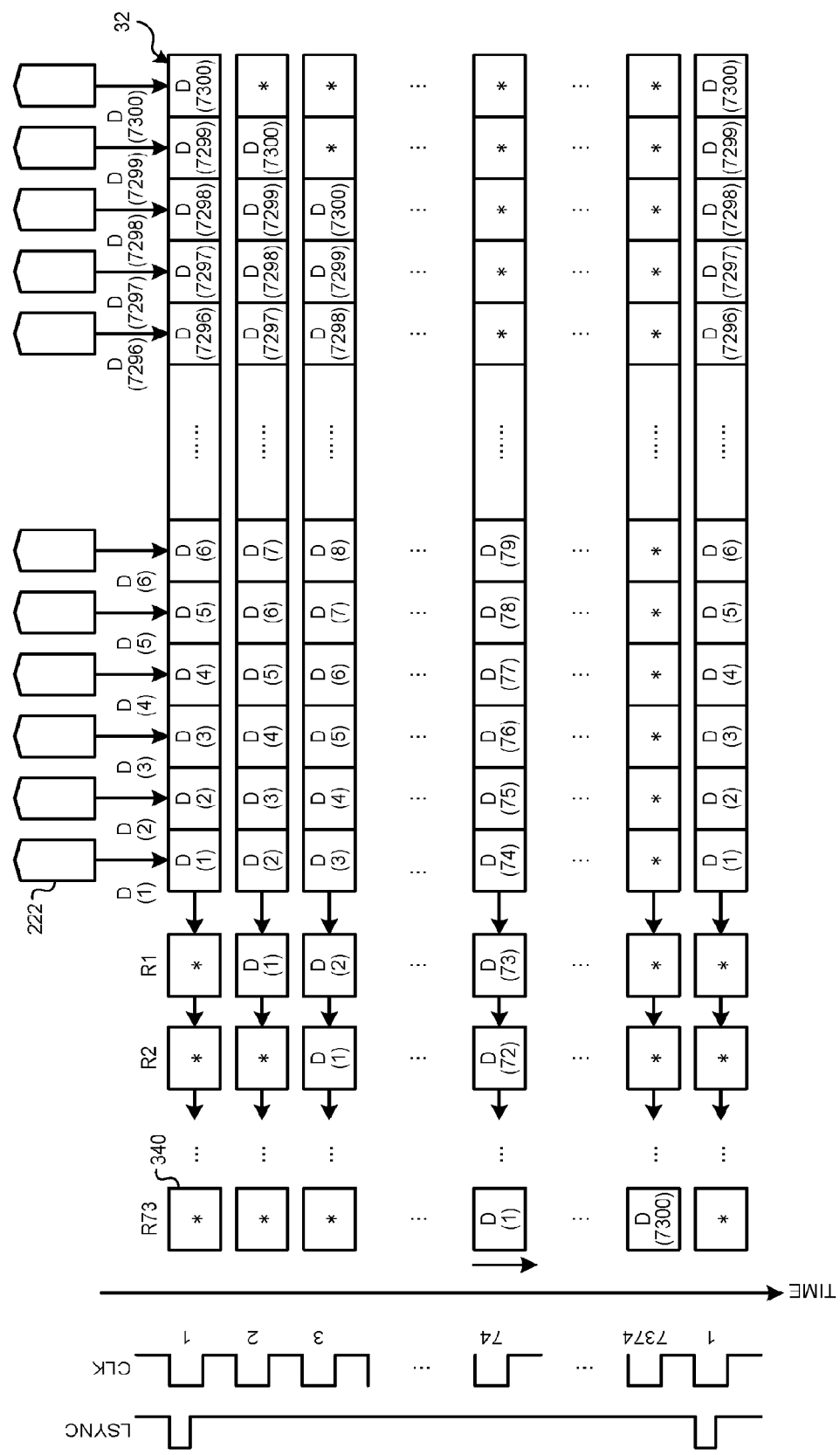
FIG. 11 depicts an operation example of the CMOS linear sensor that includes the parallel-serial conversion unit of the third configuration example.

FIG. 11 depicts an operation example of the CMOS linear sensor 20 that includes the parallel-serial conversion unit 23 of the third configuration example depicted in FIG. 10. Pixel data that are AD converted by the respective A/D converters 222 are carried to the first shift register 32 all at once. The first shift register 32 transfers the respective pixel data sequentially toward the top pixel side. That is, the first shift register 32 transfers data sequentially from the top pixel data to the transfer unit 340 (toward the left side in FIG. 10), and each of the transfer units 340 transfers toward the final-pixel-data retaining position (toward the right side in FIG. 10) of the first shift register 32, sequentially from the top pixel data.

Figure 12:
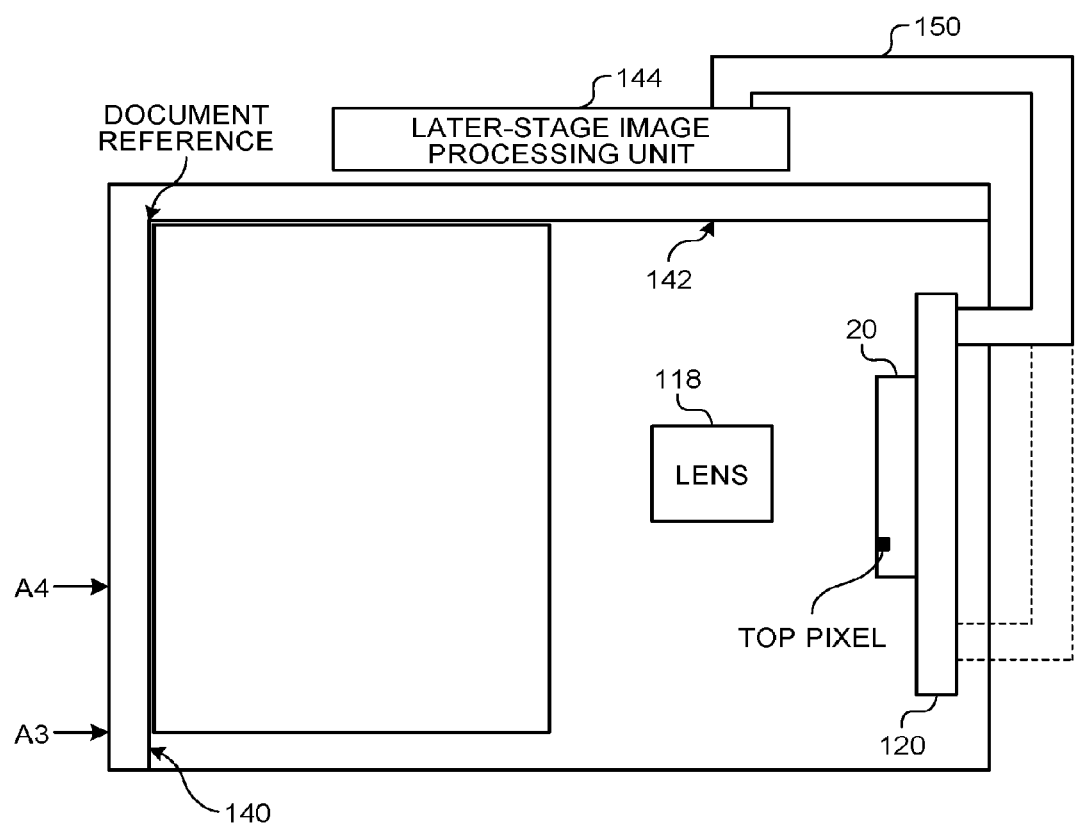
FIG. 12 depicts an essential part of a reading main unit equipped with the CMOS linear sensor that includes the parallel-serial conversion unit of the third configuration example viewed from above.

FIG. 12 depicts an essential part of the reading main unit 100 equipped with the CMOS linear sensor 20 that includes the parallel-serial conversion unit of the third configuration example viewed from above. The CMOS linear sensor 20 that includes the parallel-serial conversion unit 23 of the third configuration example can output image data in order from the top pixel data to the final pixel data as from a 1st pixel→a 2nd pixel→ . . . 7300th pixel, by conveying pixel data of the top pixel toward a rear end pixel side (toward the final pixel side) by the operation depicted in FIG. 11.

Figure 13:
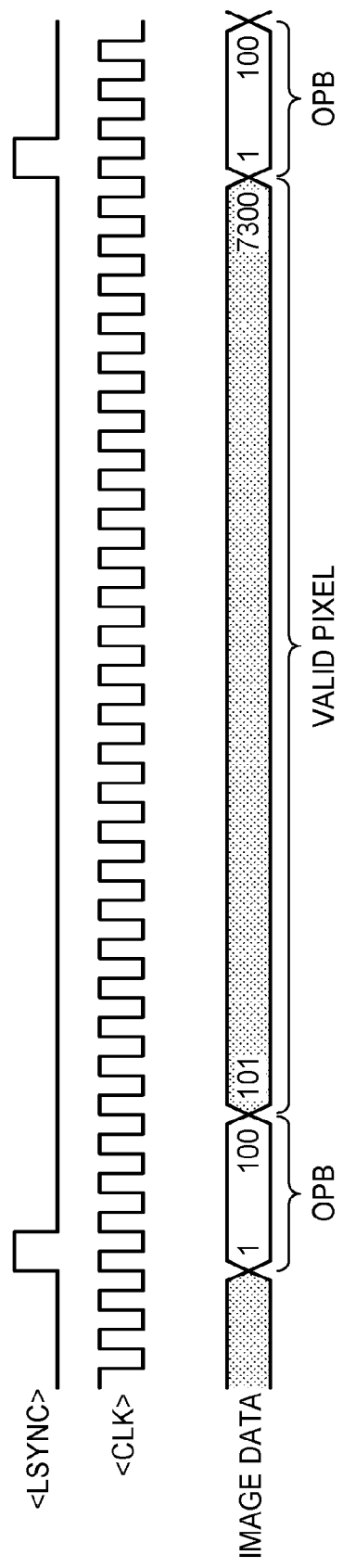
FIG. 13 is a timing chart indicating an operation example of the CMOS linear sensor.

The CMOS linear sensor 20 that includes the parallel-serial conversion unit 23 of the third configuration example is configured such that the output unit 302, the amplifying unit 25, and the LVDS 26 can be arranged on a rear end side in the main scanning direction, and a transmission distance (the harness 150) of image data can be shortened, thereby being advantageous to high speed processing and to EMI. Moreover, as depicted in FIG. 13, in the CMOS linear sensor 20, because data is read from the top pixel data numbered 1, data is to be read in order of OPB pixels→valid pixels.

Figure 14:
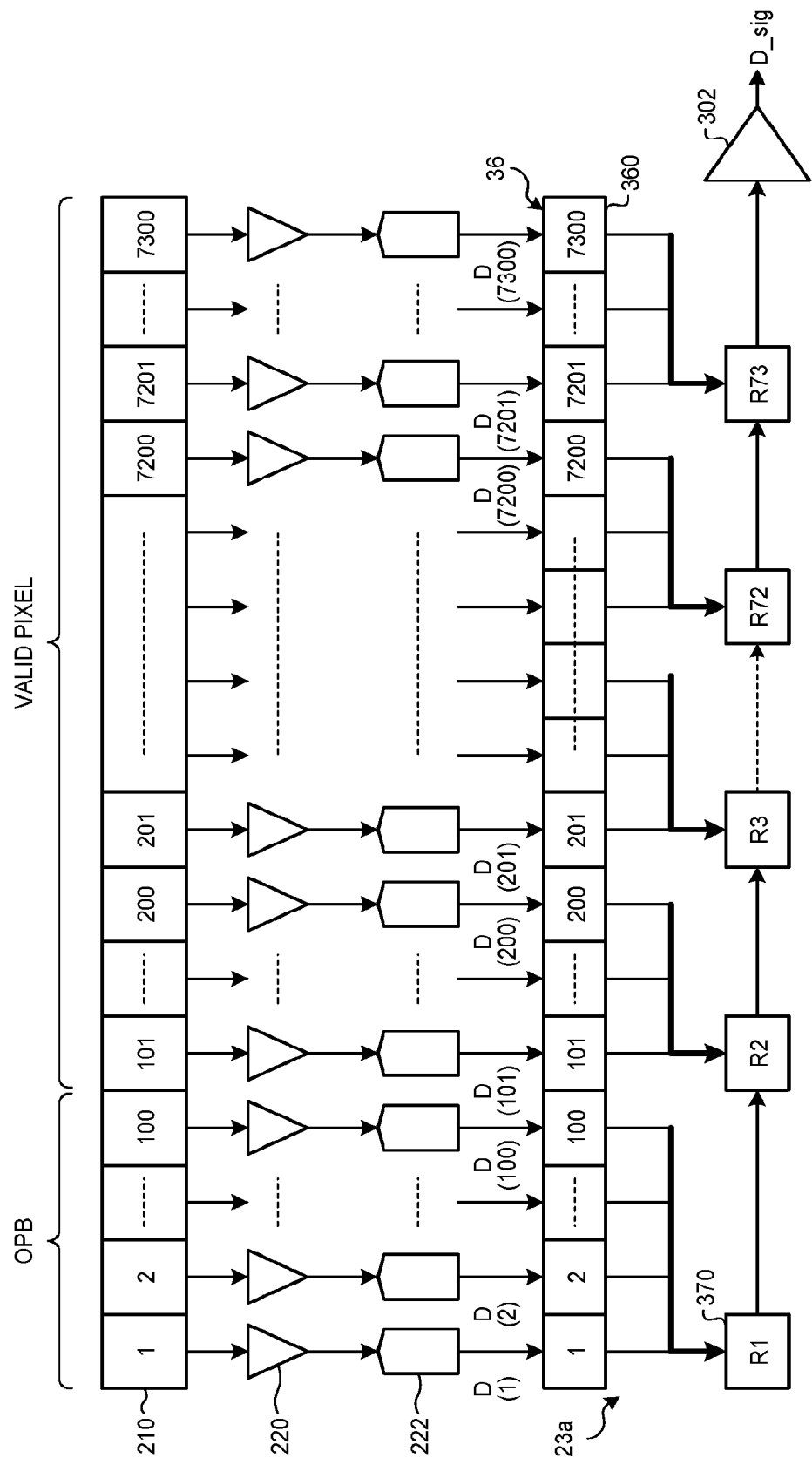
FIG. 14 depicts a fourth configuration example of the parallel-serial conversion unit and a peripheral thereof.

FIG. 14 depicts a fourth configuration example of the parallel-serial conversion unit 23 (parallel-serial conversion unit 23*a*) and a peripheral thereof. The parallel-serial conversion unit 23*a* includes a line memory 36, for example, 73 units of transfer units 370, and the output unit 302. In the line memory 36, a storage area 360 is divided, for example, into 73 systems with 100 areas each, and each system is connected to the transfer unit 370 through a data bus (digital bus). That is, the line memory 36 has a function of a retaining unit that retains pixel data. In each of the storage area 360, image data of each pixel that has been A/D converted is stored for one line period. Each of the transfer units 370 constitutes a shift register, and transfers data to the output unit 302. Each of the transfer units 370 may be a buffer that transfers a signal.

Figure 15:
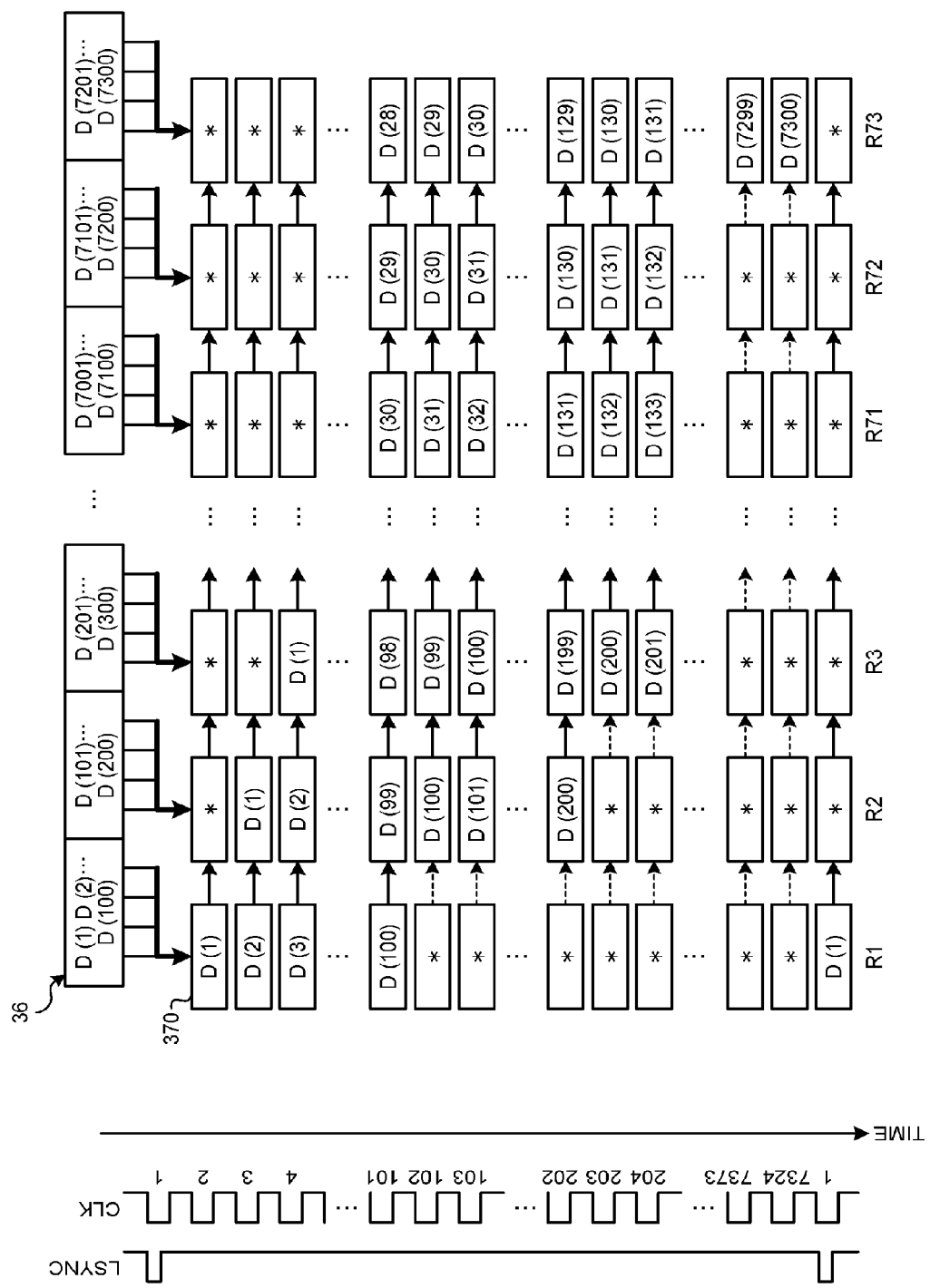
FIG. 15 indicates an operation of the parallel-serial conversion unit.

FIG. 15 indicates an operation of the parallel-serial conversion unit 23*a*. The parallel-serial conversion unit 23*a* causes the line memory 36 to retain pixel data of respective pixels that have been A/D converted by the A/D convertors 222 all at once. The transfer unit 370 of R1 sequentially reads the pixel data retained by the line memory 36 from the 1st pixel to the 100th pixel, and transfers to the transfer unit 370 of R2.

The transfer unit 370 of R2 transfers the pixel data of the 1st pixel to the 10th pixel to the transfer unit 370 of R3, and upon having transferred the pixel data of the 100th pixel to the transfer unit 370 of R3, reads pixel data of the 101st pixel and later. The transfer unit 370 of R2 sequentially reads the pixel data from the 101st pixel to the 200th pixel, and transfers to the transfer unit 370 of R3.

The transfer units 370 of R3 to R73 operate similarly. By the above operation, it is possible to rearrange pixel data to read in order from the top pixel data to the final pixel data while carrying the top pixel toward the final pixel side. Therefore, the parallel-serial conversion unit 23*a* produces a similar effect as that of the parallel-serial conversion unit 23 of the third configuration example, and a transmission distance of pixel data can be shortened, thereby being advantageous to high speed processing and to EMI. Moreover, because pixel data is read from the top pixel data numbered 1, it is read out in order of OPB pixels→valid pixels.

Figure 16:
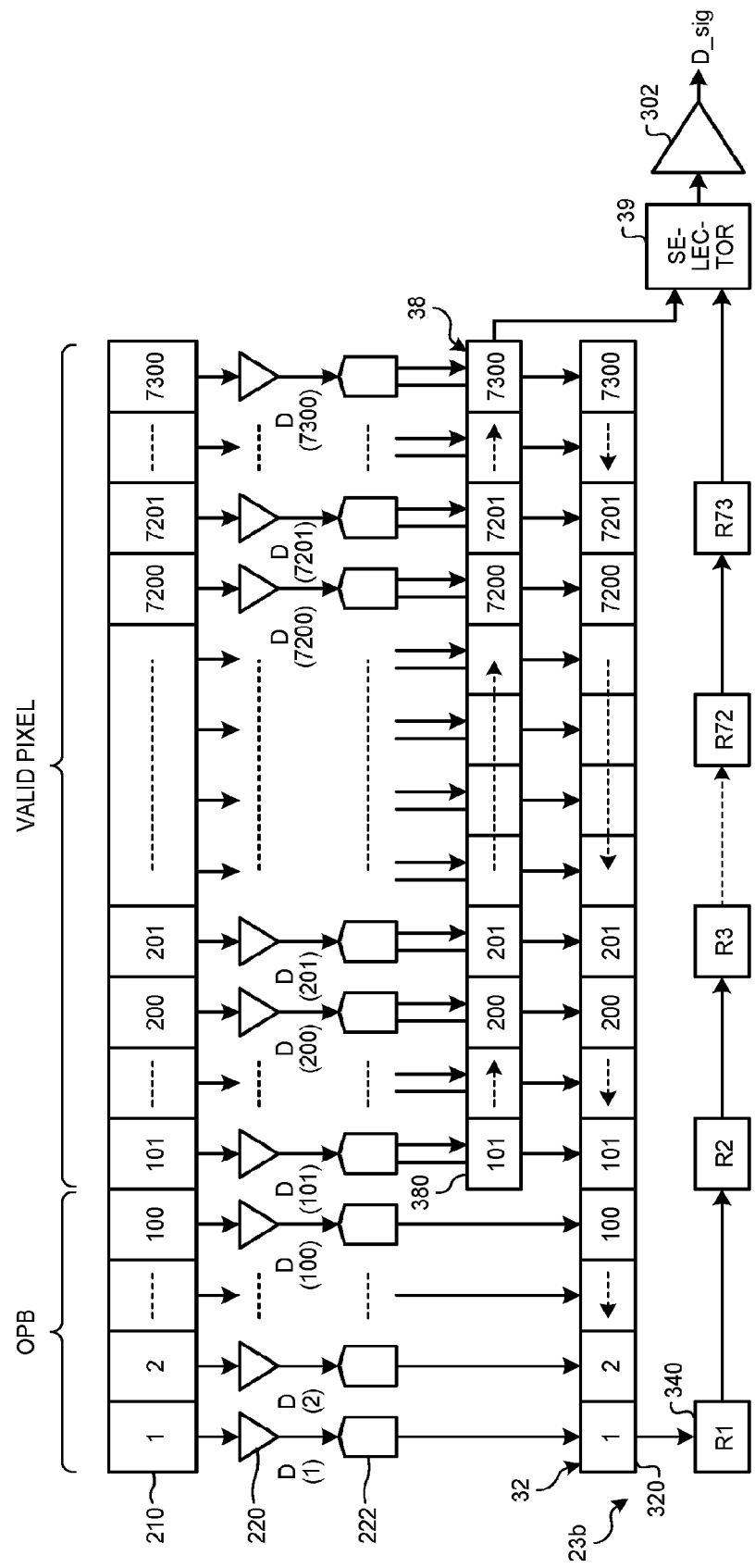
FIG. 16 depicts a fifth configuration example of the parallel-serial conversion unit and a peripheral thereof.

FIG. 16 depicts a fifth configuration example of the parallel-serial conversion unit 23 (parallel-serial conversion unit 23*b*) and a peripheral thereof. The parallel-serial conversion unit 23*b* includes the first shift register 32, 73 units of the transfer units constituting the second shift register, a third shift register 38, a selector (selecting unit) 39, and the output unit 302.

When a document is read by using the ADF 102, the relation of a top pixel in the main scanning direction/a final pixel in the main scanning direction is reversed from that of the flatbed reading (7300th pixel is positioned on a document end side), and therefore, it is necessary to perform the mirroring processing by the later-stage image processing unit 144. However, it is preferable that the mirroring processing by the later-stage image processing unit 144 be unnecessary. Accordingly, the parallel-serial conversion unit 23*b* is configured to selectable between reading valid pixels in a forward direction and reading after mirroring.

As depicted in FIG. 16, the first shift register 32 sequentially transfers the OPB pixels and the valid pixels from the top pixel. Each of the transfer units 340 (second shift register) transfers, toward the final pixel side of the first shift register 32, the pixel data that is transferred from the first shift register 32. The third shift register 38 has 7300 units (101 to 7300) of flip flops 380 connected thereto corresponding to the number of valid pixels, and transfers the valid pixels toward the final pixel side of the first shift register 32. That is, the third shift register 38 retains, in an aligned manner in one direction, multiple valid pixel data that are A/D converted by the A/D converters 222 in parallel, arranging in one direction, and transfers the data so as to be read in order reverse to that of the first shift register 32. The selector 39 makes selection of switching between pixel data transferred by the respective transfer units 340 and pixel data that is transferred by the third shift register 38, to output to the output unit 302.

Figure 17:
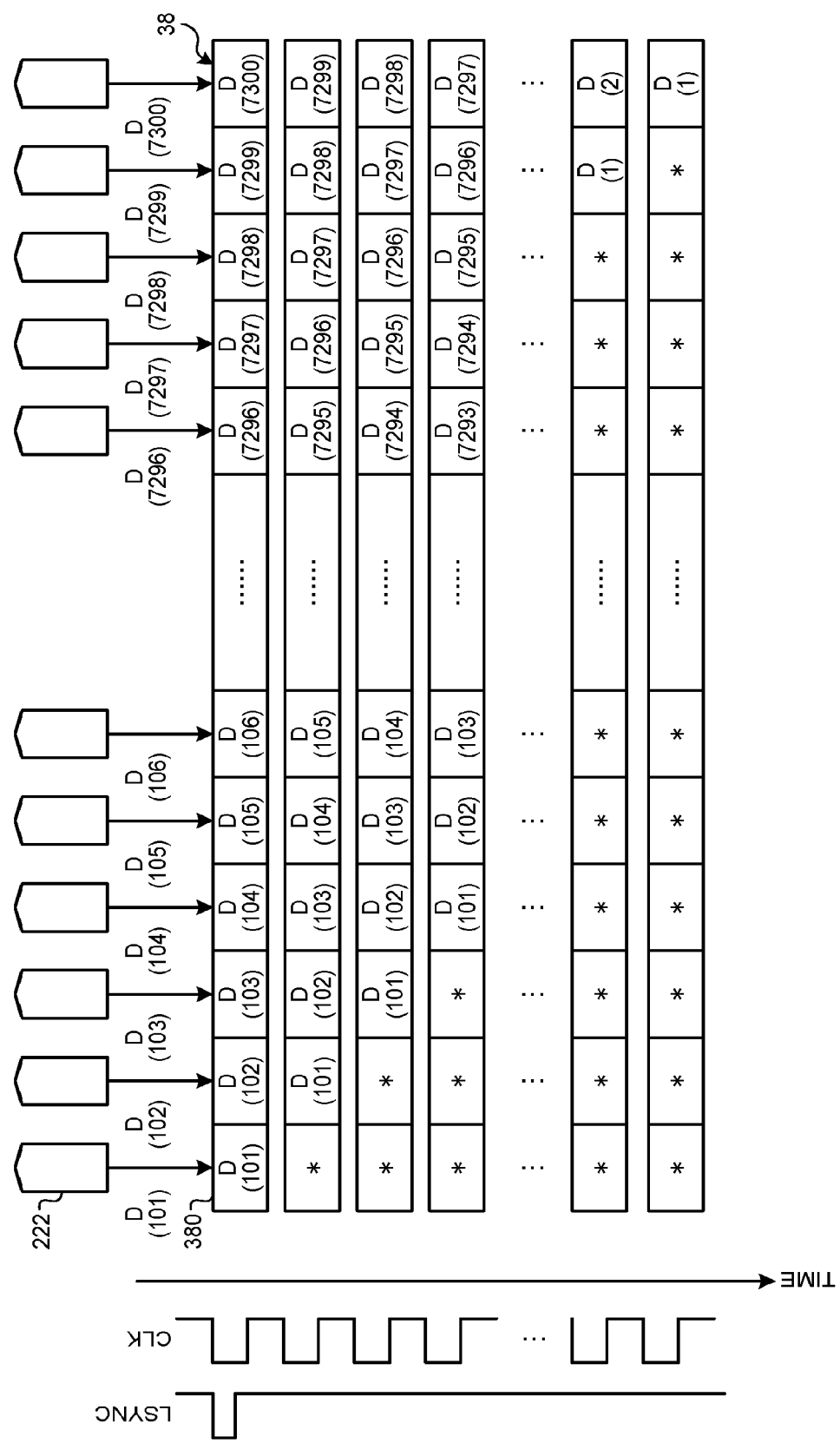
FIG. 17 indicates an operation of the parallel-serial conversion unit of the fifth configuration example.

For example, when data is to be output from the CMOS linear sensor 20 sequentially from the top pixel data, pixel data (1 to 7300) that are transferred by the first shift register 32 are output through the respective transfer units 340. On the other hand, when data is to be output from the CMOS linear sensor 20 sequentially from the final pixel data, the selector 39 causes the output unit 302 to output pixel data that are transferred by the third shift register 38 sequentially from the final pixel data as 7300th→7299th→ . . . →101st pixel after outputting the OPB pixels transferred by the first shift register 32 from the output unit 302 as depicted in FIG. 17.

Figure 18:
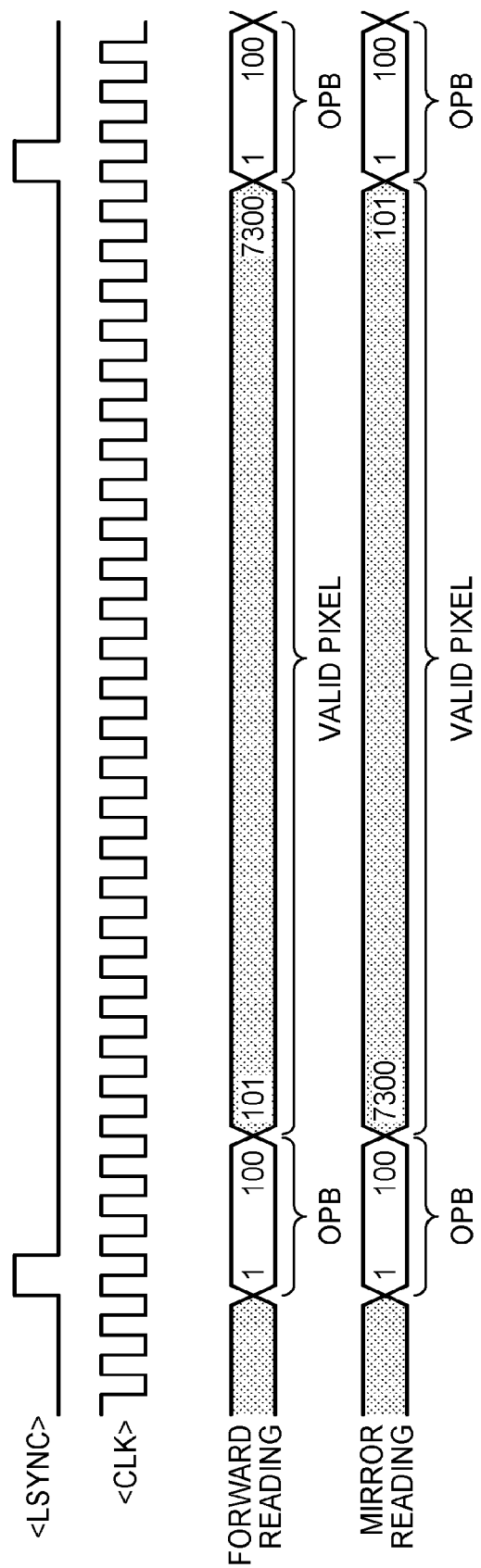
FIG. 18 depicts an operation when the parallel-serial conversion unit switches between forward reading and mirror reading.

As described above, the parallel-serial conversion unit 23b is configured to be selectable between reading from the top pixel (forward reading) and reading from the final pixel (mirror reading), and the forward reading and the mirror reading of valid pixels are switched by the selector 39 switching therebetween upon having read the 100th pixel of the OPB pixels. For example, switching by the selector 39 is set by register settings made by a user. The operation of the parallel-serial conversion unit 23b when switching between the forward reading and the mirror reading is depicted in FIG. 18. In either the forward reading or the mirror reading, pixel data is output in order of OPB pixels-→valid pixels, and either is advantageous to high speed processing and to EMI.

Figure 19:
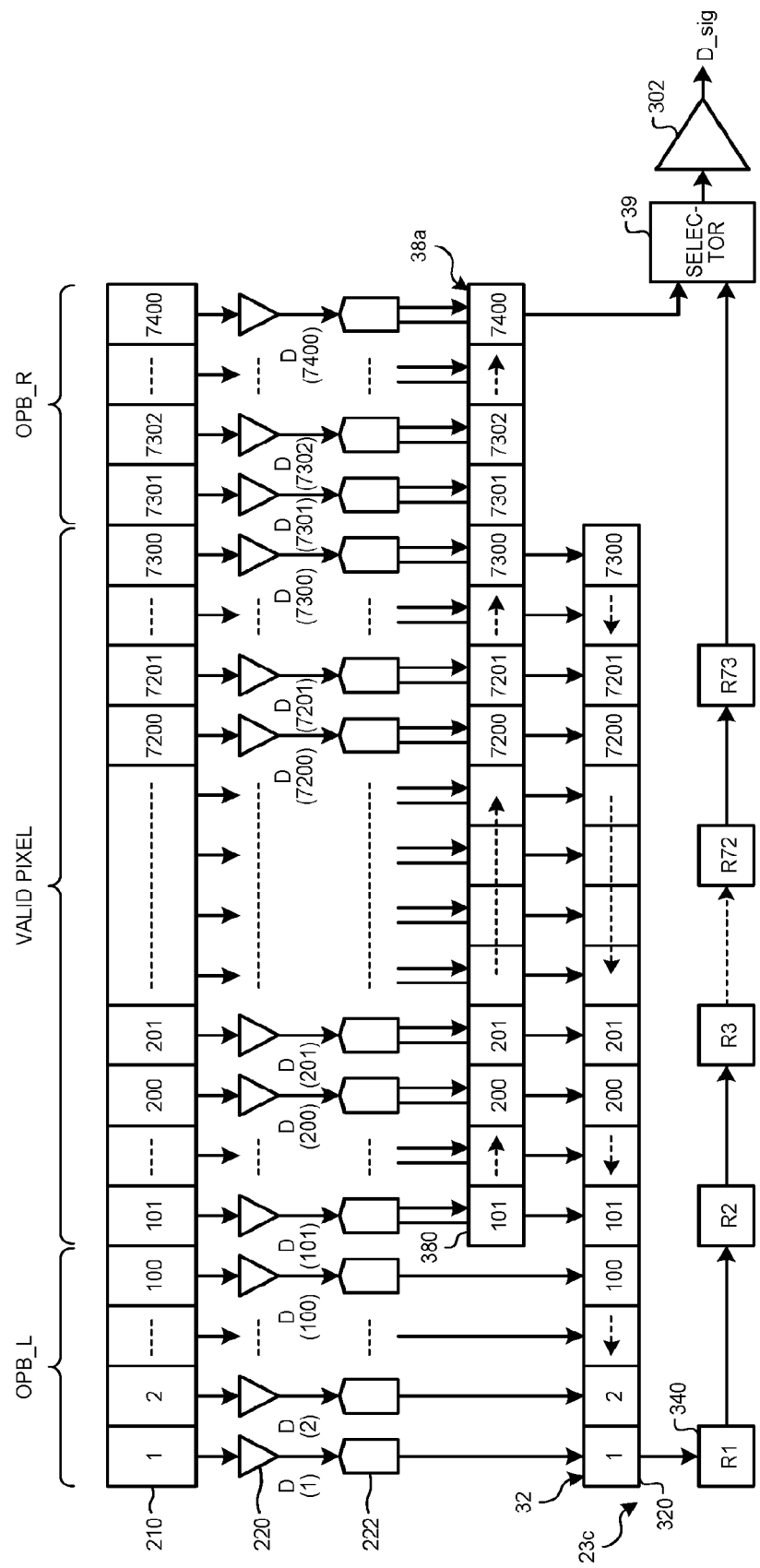
FIG. 19 depicts a sixth configuration example of the parallel-serial conversion unit and a peripheral thereof.

FIG. 19 depicts a sixth configuration example of the parallel-serial conversion unit 23 (parallel-serial conversion unit 23c) and a peripheral thereof. As depicted in FIG. 19, to the parallel-serial conversion unit 23c, third shift register 38a to which more units of FFs 380 than the third shift register 38 are connected is provided. In this example, also 7400 pieces of the photodetectors 210 are provided, and 100 pieces of OPB pixels are arranged at each of two ends of a pixel column.

In the parallel-serial conversion unit 23c, it is not necessary for the selector 39 to switch reading of pixel data in the course of reading one line in either case of the forward reading and the mirror reading. That is, the parallel-serial conversion unit 23c is capable of reading in order of OPB pixels→valid pixels, just by repeating simple transfer of pixel data either in the forward reading or in the mirror reading.

Figure 20:
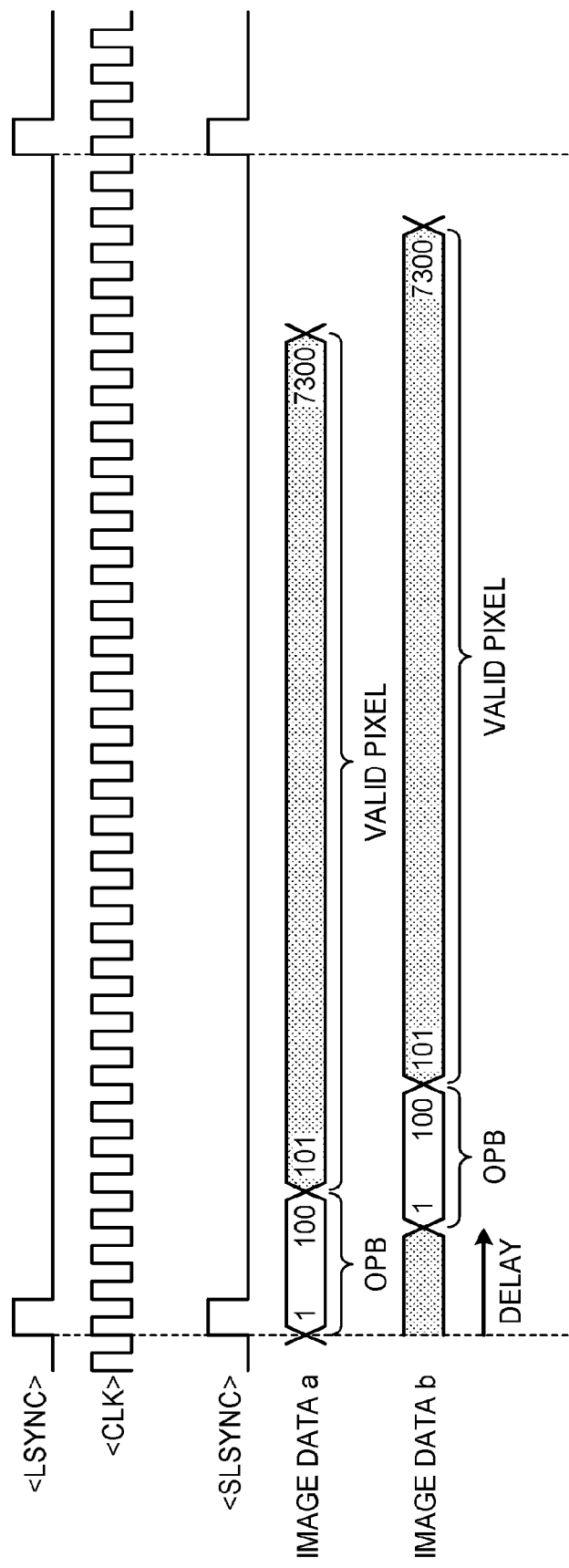
FIG. 20 is a timing chart showing delay that is caused in output of the CMOS sensor.

Next, a point to be considered when multiple units of the transfer units 340 are provided is explained. As described above, in the parallel-serial conversion unit 23 and the like in which multiple units of the transfer units 340 are provided, it is necessary to transfer pixel data to the final pixel side of the first shift register 32 by the transfer units 340 (second shift register) when outputting from the top pixel data (forward reading). Therefore, according to the number of the transfer units 340, timing of outputting the first pixel of the photodetector 210 from the CMOS linear sensor 20 is delayed as depicted in FIG. 20.

The later-stage image processing unit 144 determines whether it is an OPB pixel or a valid pixel by timing based on SLSYNC that is transmitted form the CMOS linear sensor 20. Therefore, a change in relation between SLSYNC and image data timing causes an abnormal image.

Figure 21:
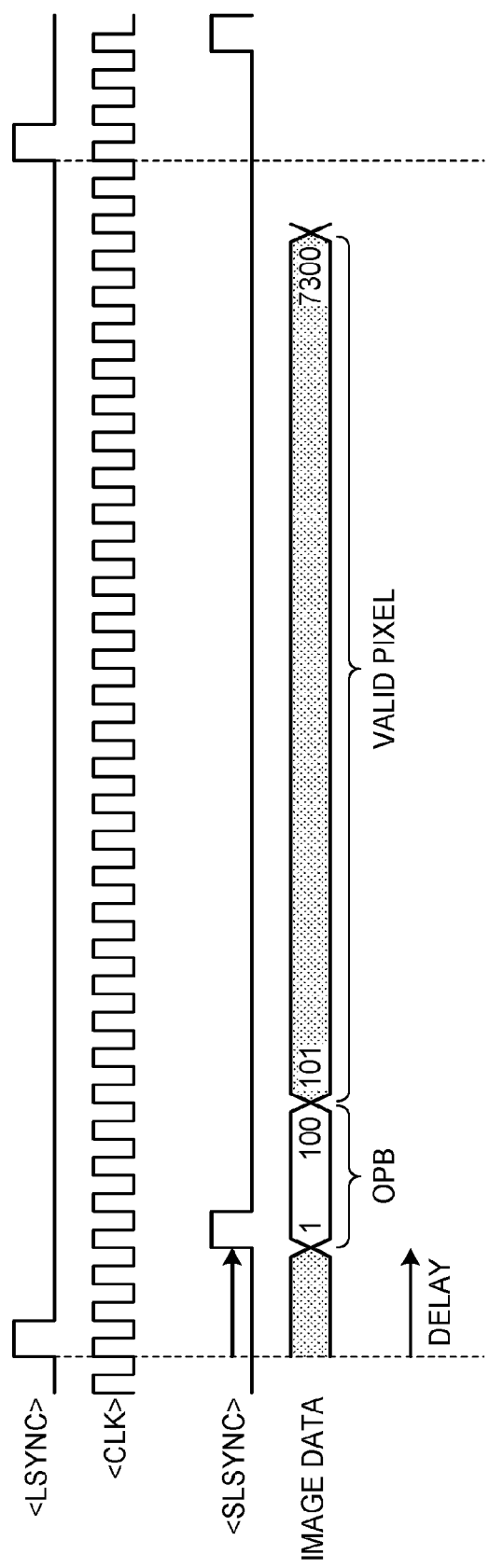
FIG. 21 is a timing chart indicating timing control that is performed by a timing control unit.

FIG. 21 is a timing chart indicating timing control that is performed, for example, by the timing control unit 24. LSYNC is a synchronization signal (first synchronization signal) to control timing of starting read of multiple pieces of pixel data from the first shift register 32 or the like. SLSYNC is a synchronization signal (second synchronization signal) that indicates timing of starting output of multiple pieces of pixel data to an external unit.

As depicted in FIG. 21, the timing control unit 24 delays SLSYNC (second synchronization signal) compared to LSYNC (first synchronization signal) according to delay time in output by multiple units of the transfer units 340, to control relation between SLSYNC and image data to be fixed. Thus, relation between SLSYNC and image data timing is to be fixed irrespective of a difference in a reading method.

Figure 22:
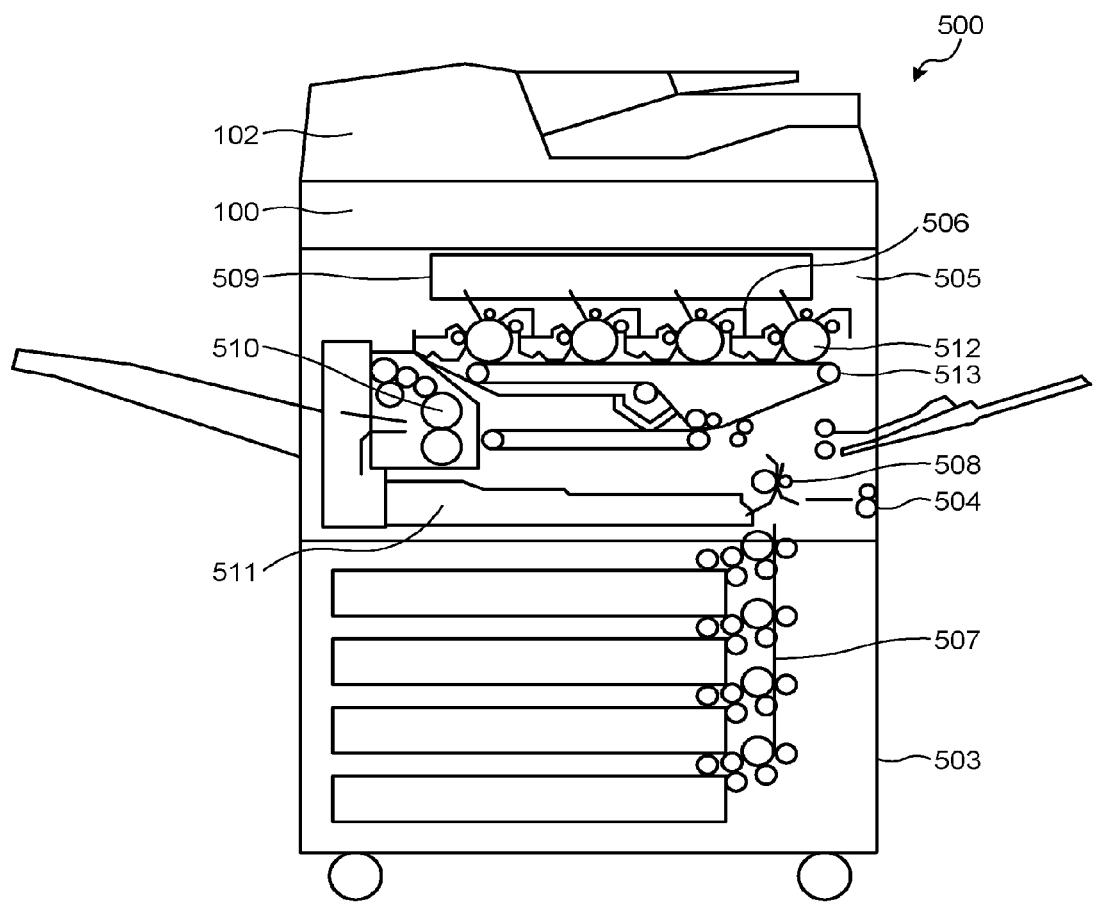
FIG. 22 is a configuration diagram depicting a configuration example of an image forming apparatus according to the embodiment.

FIG. 22 is a configuration diagram depicting a configuration example of an image forming apparatus 500 according to the embodiment. The image forming apparatus 500 includes a paper feeder unit 503 and an image-forming-apparatus main unit 504, and is a digital copier in which the reading main unit 100 and the ADF 102 are mounted on an upper part thereof.

In the image-forming-apparatus main unit 504, a tandem image forming unit (image forming unit) 505, a resist roller 508 that conveys recording paper fed by the paper feeder unit 503 through a conveying path 507 to the image forming unit 505, an optical writing device 509, a fixing conveying unit 510, and a double side tray 511 are provided.

In the image forming unit 505, four photoconductor drums 512 corresponding to toner of four colors of Y, M, C, K are arranged. Around each of the photoconductor drums 512, image forming members including a charging unit, a developing unit 506, a transfer unit, a cleaner, and a discharging unit are arranged.

Moreover, an intermediate transfer belt 513 that is stretched between a driving roller and a driven roller is arranged between the transfer unit and the photoconductor drum 512 in a state of being sandwiched by nips thereof.

The tandem image forming apparatus 500 thus configured performs optical writing per color on the photoconductor drums 512 corresponding to the respective colors of Y, M, C, K, develops per toner of each color by the developing unit 506, and performs primary transfer on the intermediate transfer belt 513, for example, in order of Y, M, C, K.

The image forming apparatus 500 performs secondary transfer of a full color image in which four colors are superimposed by the primary transfer onto recording paper, and then fixes the image and ejects the paper, thereby forming a full color image on recording paper. Moreover, the image forming apparatus 500 forms an image that is read by the reading main unit 100 on recording paper.

According to the present embodiments, such an effect is produced that even when there is a constraint in layout at the time of mounting, a transmission distance of output image data can be shortened without decreasing processing efficiency of read data at a subsequent stage.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A sensor comprising:
a plurality of photodetectors configured to be aligned in one direction, and that photoelectric convert incident light to output a pixel signal;
a plurality of analog/digital (A/D) convertors configured to convert a plurality of analog pixel signals to digital pixel signals that are output by the photodetectors in parallel in a plurality of systems; and
circuitry configured to:
retain the pixel signals converted in parallel by the A/D convertors in an aligned manner in one direction, to be arranged in reading order from a first pixel signal to a final pixel signal, and
transfer the pixel signals arranged and retained by the circuitry, sequentially from the first pixel signal from a first-pixel-signal retaining position toward a final-pixel signal retaining position of the circuitry.

2. The sensor according to claim 1, further comprising
an output circuit that outputs the pixel signals to an external, wherein
the output circuit is arranged on a side of the final-pixel-signal retaining position of the circuitry.

3. The sensor according to claim 1, wherein the circuitry includes a first shift register and a second shift register.

4. The sensor according to claim 3, wherein
the first shift register is a line memory that is enabled to read in each of a plurality of systems, and
the second shift register is connected to either one of the systems of the line memory.

5. The sensor according to claim 3, wherein the circuitry is further configured to:
retain, by a third shift register, a plurality of valid signals that are convened in parallel by the A/D convertors in an aligned manner in one direction, and transfers the valid signals so as to be read in order reverse to that of the first shift register, and
select either of a plurality of pixel signals read from the third shift register or a plurality of pixel signals transferred by the second shift register to output to an external.

6. The sensor according to claim 3, wherein the circuitry is further configured to
control timing of starting read of a plurality of pixel signals from the first shift register by a first synchronization signal, and that controls to delay a second synchronization signal compared to the first synchronization signal, according to time that is required to transfer the pixel signals by the second shift register, the second synchronization signal indicating timing of outputting the pixel signals to an external.

7. The sensor according to claim 1, wherein
one end of the photodetectors aligned in the one direction is at least one light-shielded photodetector.

8. The sensor according to claim 1, wherein
both ends of the photodetectors aligned in the one direction are at least one light-shielded photodetector.

9. An image reading device according to claim 1, comprising
the sensor of claim 1.

10. An image forming apparatus according to claim 9, comprising:
the image reading device of claim 9; and
an image forming circuitry configured to form an image based on image data that is read by the image reading device.

11. An image reading device that enables operation from a front side, and that reads a document by performing photoelectric conversion on reflected light from the document that is placed on a top surface, the image reading device comprising:
a sensor that is arranged so as to be opposed to a first reading reference in a linear form to be a reference position for reading of one side on a left side of the document that is arranged on a left side about an image forming lens, and that photoelectrically converts reflected light from the document per pixel; and
an image processor that is arranged on a rear surface side, and that accepts and processes a pixel signal that is obtained by photoelectric conversion by the sensor, wherein
the sensor includes
a plurality of photodetectors that receive, on a front surface side, reflected light from a document reference position side that is a position at which a second reading reference in a linear form to be a reference position for reading of one side on the rear surface side of the document that is arranged on the rear surface side and the first reading reference intersect at a right angle in left side of the rear surface side, that are arranged in one direction so as to receive, at the rear surface side, reflected light from the front surface side of the first reading reference, and that photoelectrically converts the reflected light to output a pixel signal;
a plurality of A/D convertors that convert a plurality of analog pixel signals to digital pixel signals that are output by the photodetectors in parallel in a plurality of systems; and
circuitry that retains the pixel signals converted in parallel by the A/D convertors in an aligned manner in one direction, to be arranged in reading order from a first pixel signal to a final pixel signal and transfers the pixel signals arranged and retained by the circuitry, sequentially from the first pixel signal from a first-pixel-signal retaining position toward a final-pixel signal retaining position of the circuitry.

12. An image forming apparatus according to claim 11, comprising:
the image reading device of claim 11; and
circuitry configured to form an image based on image data that is read by the image reading device.

13. A photoelectric conversion method performed by a sensor, the method comprising:
photoelectrically converting, by a plurality of photodetectors, incident light to output a pixel signal;
converting, by a plurality of analog/digital (A/D) convertors, a plurality of analog pixel signals to digital pixel signals that are output by the photodetectors in parallel in a plurality of systems;
retaining, by circuitry, the pixel signals converted in parallel by the A/D convertors in an aligned manner in one direction, to be arranged in reading order from a first pixel signal to a final pixel signal; and
transferring, by the circuitry, the pixel signals arranged and retained by the circuitry, sequentially from the first pixel signal from a first-pixel-signal retaining position toward a final-pixel signal retaining position of the circuitry.

* * * * *